United States Patent
Theofanous et al.

(10) Patent No.: US 9,368,238 B2
(45) Date of Patent: Jun. 14, 2016

(54) NUCLEAR REACTOR MELT ARREST AND COOLABILITY DEVICE

(75) Inventors: Theo G. Theofanous, Santa Barbara, CA (US); Nam Truc Dinh, Idaho Falls, ID (US); Richard M. Wachowiak, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1575 days.

(21) Appl. No.: 12/640,399

(22) Filed: Dec. 17, 2009

(65) Prior Publication Data

US 2011/0150165 A1 Jun. 23, 2011

(51) Int. Cl.
G21C 9/00 (2006.01)
G21C 9/016 (2006.01)
G21C 11/08 (2006.01)

(52) U.S. Cl.
CPC ............... *G21C 9/016* (2013.01); *G21C 11/08* (2013.01); *Y02E 30/40* (2013.01)

(58) Field of Classification Search
USPC .................................. 376/277, 280, 287, 288
See application file for complete search history.

(56) References Cited

U.S. PATENT DOCUMENTS 5,343,506 A 8/1994 Artnik et al.

FOREIGN PATENT DOCUMENTS

EP 1988551 11/2008
WO WO2007-099898 A1 9/2007

OTHER PUBLICATIONS

NEDO-33201, Revision 3, "ESBWR Certification Probabilistic Risk Assessment," Section 21.5, Containment and BIMAC Performance Against Basemat Melt Penetration (BMP), Dated May 31, 2008.*
Nuclear Regulatory Commission document NEDO-33201, Revision 2, "ESBWR Design Certification Probabilistic Risk Assessment".
Office Action dated Oct. 28, 2014 from corresponding Japanese Patent Application No. 2010-230179.
Wachowiak, et al., "21.5 Containment and BIMAC Performance Against BASEMAT Melt Penetration (BMP)," *ESBWR Certification Probabilistic Risk Assessment*, May 2008, NEDO-33201, Revision 3, 44 p.
European Search Report dated May 28, 2014 issued in EP Application No. 10187579.7.
Management of Severe Accident Phenomena in the ESBWR Design dated Mar. 7, 2006 by Rick Wachowiak.

* cited by examiner

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

Example embodiments provide a Basemat-Internal Melt Arrest and Coolability device (BiMAC) that offers improved spatial and mechanical characteristics for use in damage prevention and risk mitigation in accident scenarios. Example embodiments may include a BiMAC having an inclination of less than 10-degrees from the basemat floor and/or coolant channels of less than 4 inches in diameter, while maintaining minimum safety margins required by the Nuclear Regulatory Commission.

15 Claims, 5 Drawing Sheets

US 9,368,238 B2

NUCLEAR REACTOR MELT ARREST AND COOLABILITY DEVICE

GOVERNMENT SUPPORT

This invention was made with Government support under contract number DE-FC07-07ID14778, awarded by the U.S. Department of Energy. The Government has certain rights in the invention.

BACKGROUND

1. Field

Example embodiments generally relate to risk mitigation components used in nuclear power plants.

2. Description of Related Art

Nuclear reactors use a variety of damage prevention/mitigation devices and strategies to minimize the risk of, and damage during, unexpected plant events. An important aspect of risk mitigation is prevention of radioactive material escape into the environment. A containment building is conventionally constructed for this purpose to surround the reactor core, and several risk mitigation devices are used to ensure that the containment building is not breached during transient events.

A known damage and risk mitigation device is a Basemat-Internal Melt Arrest and Coolability device (BiMAC). A BiMAC is designed to prevent or reduce damage to the containment building in the case of a severe reactor accident involving reactor vessel breach and forceful relocation of molten core components to the containment building floor, or basemat. The ultimate purpose of the BiMAC, combined with several other layers of risk mitigation components and strategies, is to maintain containment integrity at least for 24 hours following the most probable severe nuclear plant accidents and, for known accident scenarios involving core-concrete interaction, reduce the likelihood of containment breach to 0.1% or less.

FIG. 1 is an illustration of a conventional containment building 10 cross section. Although containment 10 is shown in FIG. 1 having components and characteristics of an Economic Simplified Boiling Water Reactor (ESBWR), it is understood that components described therein are usable with other plant configurations. As shown in FIG. 1, containment 10 includes a reactor vessel 50 containing a core 55 filled with nuclear fuel bundles. A number of control blades 56 and control blade drives may be positioned below the core 55 and may be extended into core 55 to control the nuclear reaction therein. In an ESBWR, containment 10 may also include a gravity-driven coolant system 20, which may be a large, water-filled tank used to cool the core 55 in the event of a loss of primary coolant. Further, a suppression pool 25 may be within containment 10 and used to condense steam from vessel 50 and relieve pressure in the event of an accident.

A reinforced concrete containment vessel 15 surrounds the vessel 50 and several reactor components, so as to contain any radioactive materials that may escape from vessel 50 or other components during normal operation or during an accident. A lower drywell 60 is formed below the vessel 50 to house control blades 56, control blade drives, and core instrumentation and to provide space for core debris in the instance of vessel 50 breach or leak. For an ESBWR, the lower drywell 60 is largely circular with a diameter of approximately 11.2 meters. A liner 61 conventionally is placed over the concrete containment wall 15 in order to reduce corrosion and damage to wall 15 in the event of an hazardous material release in containment 10.

Basemat 62 is conventionally the lowest point of containment 10 and fabricated of similar materials as the reinforced concrete containment wall 15, directly above the ground. A BiMAC 100 may be placed above the basemat 62 to mitigate damage to basemat 62 in the event that molten or other core 55 debris is relocated to lower drywell 60, such as in the event of vessel 50 breach.

FIG. 2 is a detailed view of a conventional BiMAC 100 useable in ESBWRs. BiMAC 100 is described in Nuclear Regulatory Commission document NEDO-33201, Revision 2, "ESBWR DESIGN CERTIFICATION PROBABILISTIC RISK ASSESSMENT" ("NEDO-33201 Document"), which is incorporated herein by reference in its entirety. As shown in FIG. 2, BiMAC 100 may be placed immediately above basemat 62 and/or liner 61. Further, BiMAC 100 may line lower portions of the walls of the lower drywell 60.

A coolant supply line 65 may be connected to and may deliver coolant material to the BiMAC 100. Coolant may include a liquid having a high heat-absorption capacity, such as water. Coolant supply line 65 may be connected to a coolant source, and coolant may be delivered through coolant supply line 65 by a pump or other driving mechanism. Alternatively, coolant may be driven through coolant supply line 65 to BiMAC 100 by gravity alone, so as to be more fail-safe. For example, supply line 61 may be a lower drywell deluge line that connects to a pool of the gravity-driven coolant system 25 (FIG. 1) or other pool within containment 10. A fail-safe valve or other control mechanism, such as a squib valve, may initiate coolant flow through coolant supply line 65 to BiMAC 100 in the case of lower vessel 50 (FIG. 1) breach or other event.

BiMAC 100 includes a distributor line 120 that may connect to the coolant supply line 65 and/or other coolant source. Distributor line 120 may extend the entire length of the drywell 60 along basemat 62. Several parallel coolant channels 130 may extend, perpendicularly or otherwise, off of distributor line 120 at a 10-degree upward angle from the basemat. Coolant channels 130 may then extend up a portion of the lower drywell wall, where they terminate with an open end. In this way, coolant may flow into distributor line 120, feed into each coolant channel 130, and eventually flood into lower drywell 60. Distributor line 120 and coolant channels 130 may be fabricated of a material that substantially maintains its physical properties in an operating and transient nuclear reactor environment. For example, distributor line 120 and coolant channels 130 may be fabricated from a zirconium-based alloy, stainless steel, etc.

An ablation shield 110 may be placed over and/or may coat coolant channels 130 and distributor line 120. The ablation shield 110 may protect coolant channels 130 and distributor line 120 from thermal and chemical damage caused by molten core components forcefully relocating to lower drywell 60 in the event of vessel 50 breach. The ablation shield 110 may be fabricated from an inert, heat resistant, and conductive material, such as a ceramic or concrete. Additional shielding material 140 may be placed adjacent to coolant channels 130 to support the weight of core components relocated on top of BiMAC 100 during a vessel breach event. Additional shielding material 140 may be fabricated of a number of strong materials, such as concrete, ceramics, etc.

FIG. 3 is a detailed cross-sectional view of the coolant channels 130 of BiMAC 100. As shown in FIG. 3, channels 130 may be parallel and touch, so as to form a continuous wedge-shaped jacket of channels 130 capable of cooling the BiMAC and materials relocated thereon. Each channel 130 is 3.937 inches in inner diameter to provide sufficient coolant flow therethrough, as approved in the NEDO-33201 document. Ablation shield 110 may be formed directly atop and cover each channel 130, in order to provide heat conduction and cooling therethrough. Ablation shield 110 may be formed to different thicknesses than that shown in FIG. 3, depending on the material used to fabricate ablation shield 110 and the characteristics of the material to be cooled on top of ablation shield 110.

FIG. 4 is a top-down perspective view of BiMAC 100 illustrating operation of BiMAC 100 during an accident scenario. As shown in FIG. 4, during an initiating event, a valve is opened, permitting coolant flow down through a coolant supply line 65 to distribution line 120. Coolant flows into either end of distribution line 120 and then into coolant channels 130 up at a 10-degree angle toward walls 15. As molten or other hot debris is relocated to the lower drywell on top of an ablation shield 110 covering coolant channels 130, forced coolant flow through coolant channels 130 removes heat from the relocated debris, preventing continued melt and/or damage to basemat 62 and containment walls 15. Coolant exits the coolant channels 130 at a higher open end point of each channel 130, eventually flooding the lower drywell 60 and further aiding in cooling debris therein. As such, open end points of each channel 130 are typically located such that relocated debris cannot clog the channels 130. Further, if coolant flow to BiMAC 100 is provided by gravity, coolant flow and cooling may continue even if other plant mechanical systems fail that would otherwise be required to pump coolant into BiMAC 100, resulting in continuous, natural-circulation cooling.

The structure and function of BiMAC 100 described in FIGS. 1-4 has been extensively tested and submitted for approval to the Nuclear Regulatory Commission with dimensions of 3.937 inch inner diameter for coolant channels 130 and a 10-degree incline for coolant channels 130 with respect to basemat 62 in an ESBWR having an 11.2 meter diameter lower drywell 60.

SUMMARY

Example embodiments provide a Basemat-Internal Melt Arrest and Coolability device (BiMAC) that offers improved spatial and mechanical characteristics for use in damage prevention and risk mitigation in accident scenarios. Example embodiments may include a BiMAC having an inclination of less than 10-degrees from the basemat floor and/or coolant channels of less than 4 inches in diameter, while maintaining minimum safety margins required by the Nuclear Regulatory Commission.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
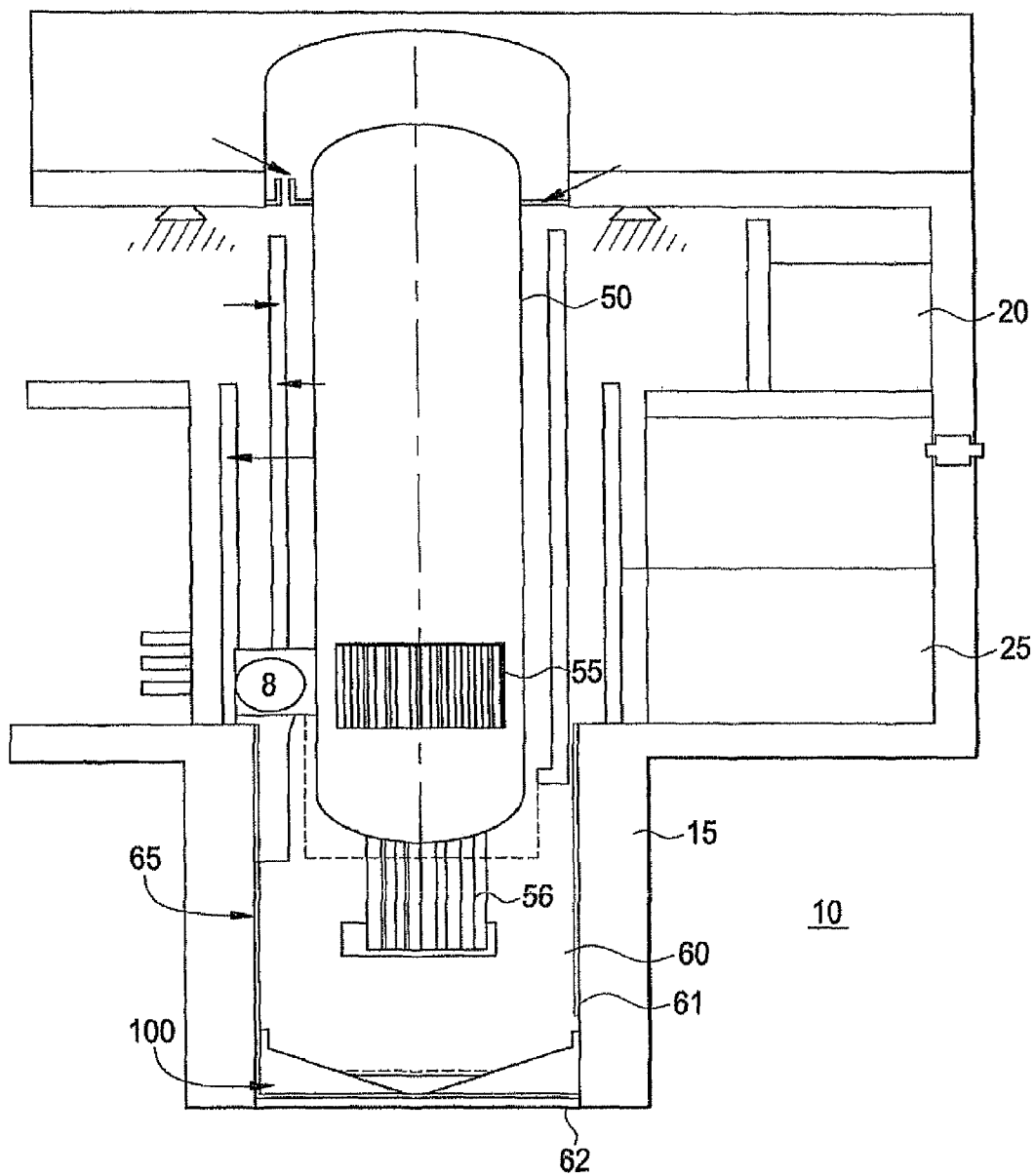
FIG. 1 is an illustration of a schematic of a conventional containment building for a nuclear reactor.
Figure 2:
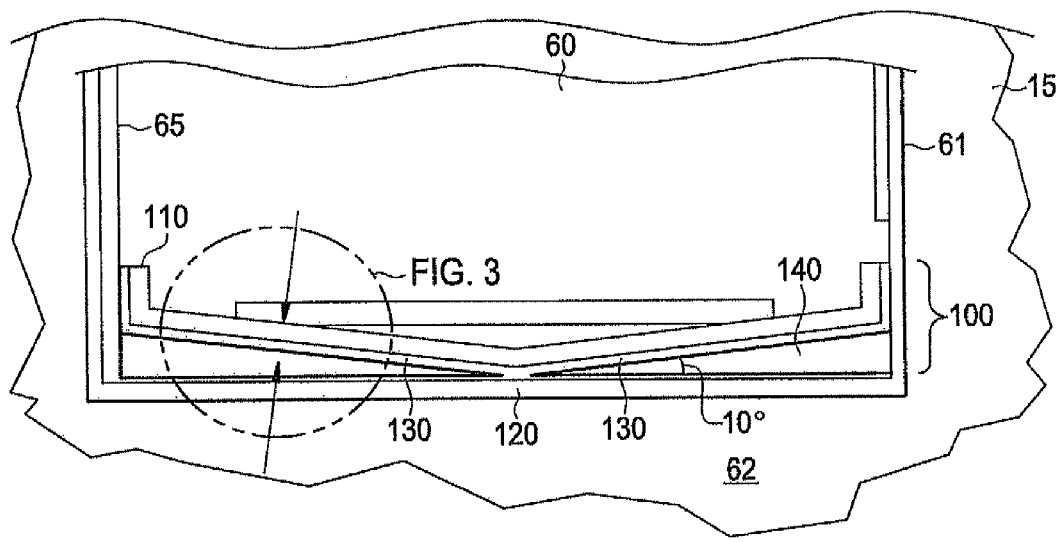
FIG. 2 is an illustration of a conventional lower drywell and Basemat-Internal Melt Arrest and Coolability device.
Figure 3:
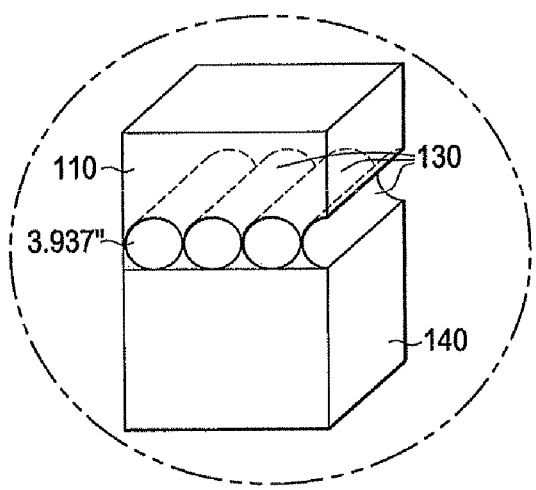
FIG. 3 is a detailed view of a conventional Basemat-Internal Melt Arrest and Coolability device.
Figure 4:
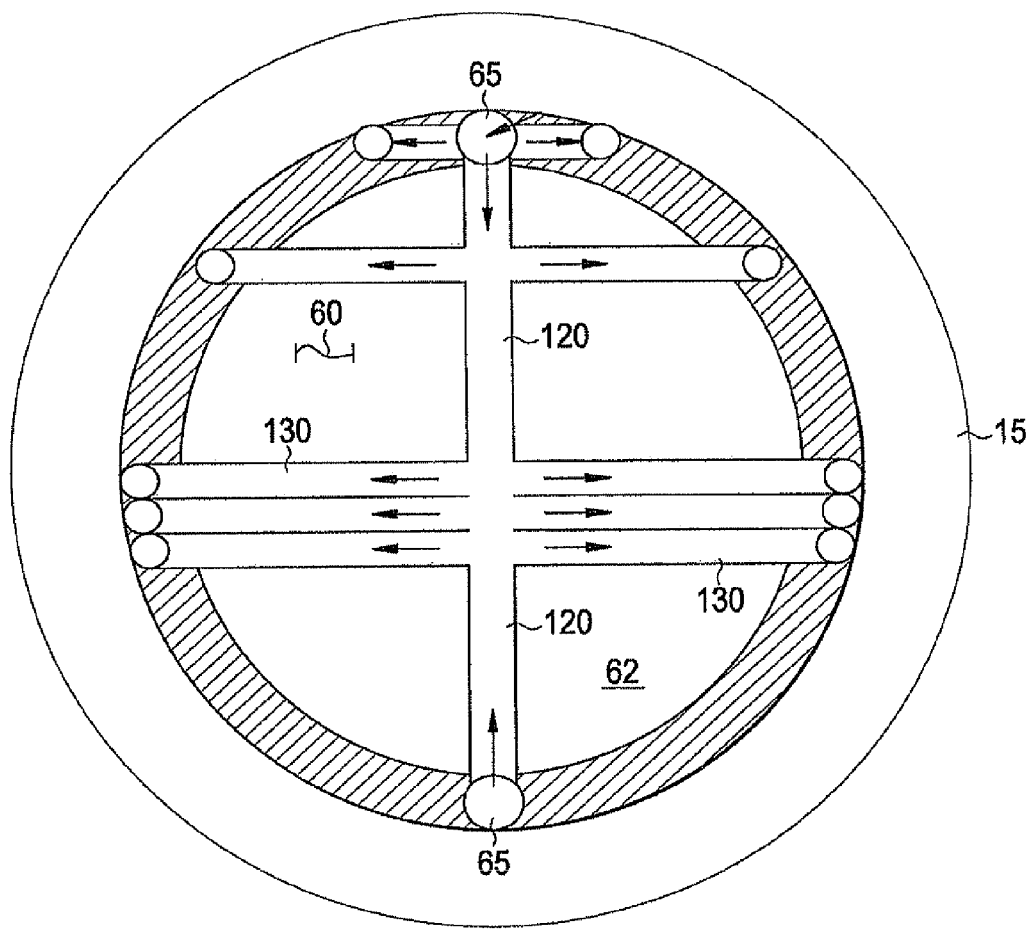
FIG. 4 is another view of a conventional Basemat-Internal Melt Arrest and Coolability device.

Detailed illustrative embodiments of example embodiments are disclosed herein. However, specific structural and functional details disclosed herein are merely representative for purposes of describing example embodiments. For example, although example embodiments may be described with reference to an Economic Simplified Boiling Water Reactor (ESBWR), it is understood that example embodiments may be useable in other types of nuclear plants and in other technological fields. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The inventors have recognized that a BiMAC having a decreased height, and additional volume of lower drywell 60 created by the lower height, may improve accident mitigation in certain cases of core melting and relocation to drywell 60, including scenarios where the relocation occurs rapidly and under very high pressure. A BiMAC having a lower height will have a smaller surface area and coolant channel length, potentially providing greater protection against damage from crushing and explosive forces experienced in the instance of high-pressure vessel rupture onto the BiMAC. A BiMAC having a lower height will have a more horizontal, and less "wedged" surface, potentially reducing natural convection currents in coolant channels subject to the greatest heat flux loads at edges of conventional BiMAC 100. Additionally, the inventors have recognized that the lower height permits smaller internal channels, offering improved crushing protection.

Further, the inventors have recognized that a larger lower drywell volume may better accommodate and contain larger amounts of caustic, radioactive molten core and plant components and reduce the likelihood of materials being relocated to other, less confined areas of containment 10. The inventors have further recognized that additional volume in lower drywell 60 may permit greater access to lower drywell 60 for maintenance of control rod drives and instrumentation housed in lower drywell 60.

Figure 5:
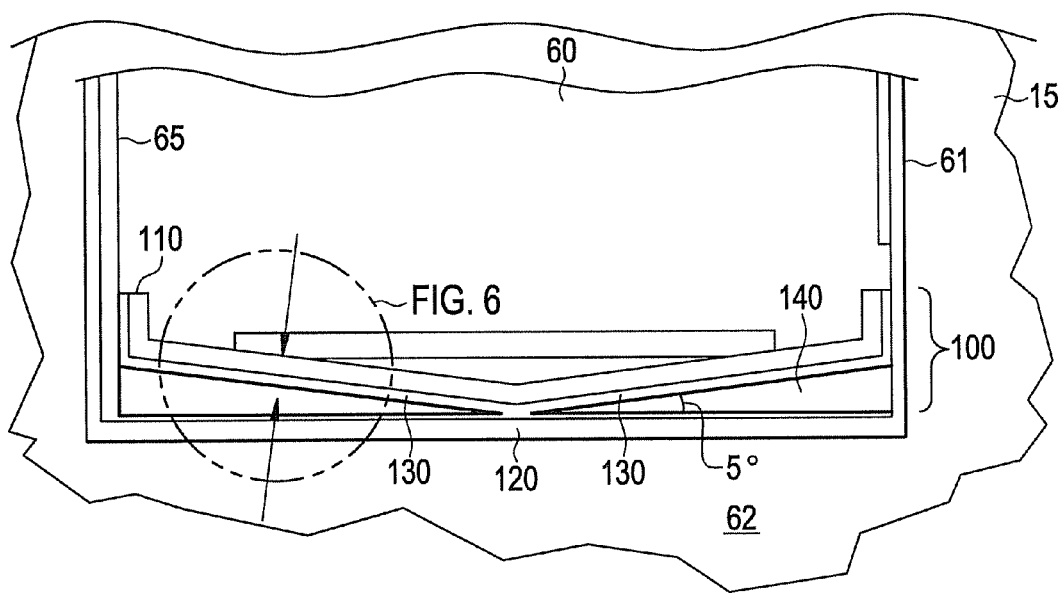
FIG. 5 is an illustration of an example embodiment Basemat-Internal Melt Arrest and Coolability device.
Figure 6:
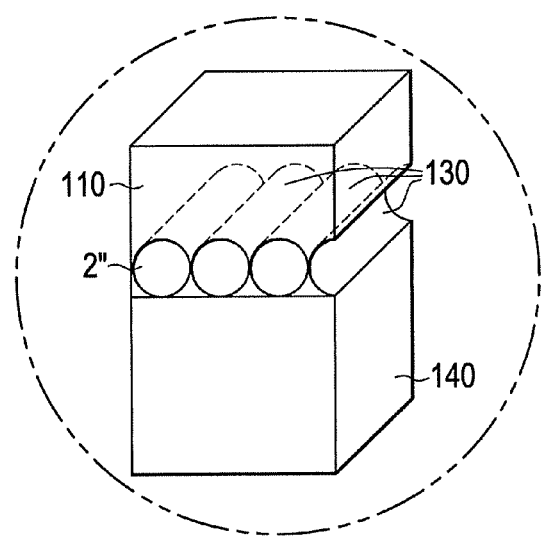
FIG. 6 is a detail view of an example embodiment Basemat-Internal Melt Arrest and Coolability device.

FIG. 5 illustrates an example embodiment BiMAC 200, and FIG. 6 is a detailed cross-sectional view of example embodiment BiMAC 200. Example embodiment BiMAC 200 may share several features with conventional BiMAC 100 described in FIGS. 1-4, with like reference numbers indicating like features, whose redundant description is omitted. As shown in FIG. 5, coolant channels 130 are inclined at less than 10 degrees, such as at approximately 5 degrees, in example embodiment BiMAC 200. As shown in FIG. 6, coolant channels 130 may have a reduced inner diameter of less than 4 inches, such as approximately 2 inches. For a lower drywell 60 with an 11.2 meter diameter, example embodiment BiMAC 200 has a maximum coolant channel 130 length of approximately 5.62 meters, compared to a maximum coolant channel 130 length of approximately 5.69 meters in conventional BiMAC 100 having a 10-degree incline. Thus, example embodiment BiMAC 200 has a lower surface area, and will experience less loading strain, than conventional BiMAC 100.

Also, example embodiment BiMAC 200 has a maximum height of about 0.49 meters, compared to conventional BiMAC 100 that is about 0.99 meters high. Thus, example embodiment BiMAC 200 frees approximately half a meter of vertical space in the lower drywell 60 compared to conventional BiMAC 100, because of the approximate 5-degree coolant channel incline. Further example embodiment BiMAC 200, having a lower and more level floor, is useable with a wider variety of ablation shield 110 materials, including poured concrete, which may benefit from a level pouring surface.

While example embodiment BiMAC 200 possesses several spatial and mechanical advantages over conventional BiMAC 100, there was no expectation that example embodiment BiMAC 200 would successfully function in the same accident scenarios used to test and certify conventional BiMACs in the related art. Only the conventional 10-degree BiMAC 100 has known functionality in molten core relocation accident scenarios. In fact, the NEDO-33201 Document shows that a BiMAC having greater than 10-degree incline with more than 4-inch diameter coolant channels would be required for such an accident scenario in conventional ESBWR commercial power plants. Thus, the inventors subjected example embodiment BiMAC 200, having less than 10-degree incline and 4-degree diameters, to lengthy testing to ensure cooling and risk mitigation functionality.

A model of example embodiment BiMAC 200, having an approximately 5-degree incline and 2-inch inner diameter coolant channel 130 as shown in FIGS. 5 and 6, was constructed and subject to thermal loads encountered in the same scenarios discussed in the NEDO-33201 Document. Specifically, central coolant channels 130 were subjected to an average thermal load of 100 kW/m$^2$ with local peaking loads of 125 kW/m$^2$; coolant channels 130 near edges of example embodiment BiMAC 200 were subjected to an average heat load of 100 kW/m$^2$ with local peaking loads of 300 kW/m$^2$; and portions coolant channel 130 extending vertically upward in example embodiment BiMAC 200 were subject to an average heat load of 320 kW/m$^2$ with local peaking loads of 450 kW/m$^2$. Heating was supplied by electric-powered copper cartridge and band heaters.

Criteria measuring sustainability and failure of example embodiment BiMAC 200 included instantaneous flow rates in each coolant channel 130, temperature of coolant channels 130, coolant pressure drop through coolant channels 130, and coolant void fraction at open end of coolant channels 130, through which coolant exited. Heat loads and coolant flow were applied over the course of 10 hours to ascertain sustainability.

Figure 7:
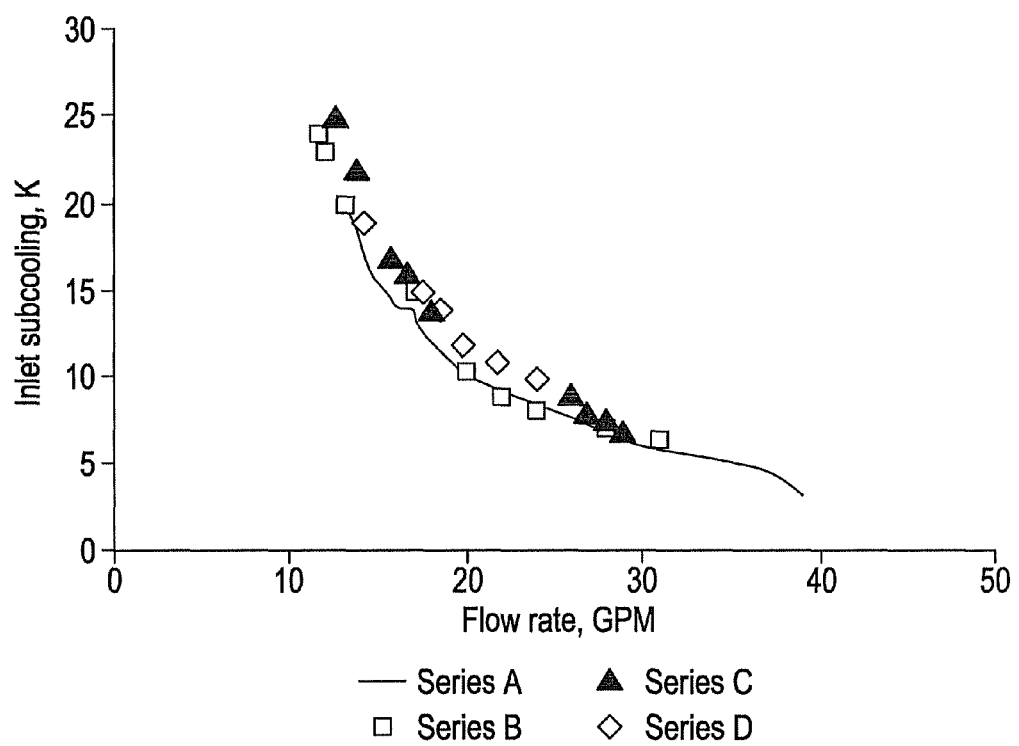
FIG. 7 is a graph of experimental results showing example embodiment Basemat-Internal Melt Arrest and Coolability device compliance with performance criteria.

Results of the testing indicated that required thermal load absorption was maintained throughout the experiment involving example embodiment BiMAC 200. No flow instability, changes in pressure distribution, or complete voiding were experienced in the experiment. Further, complete voiding and burnout within coolant channels 130 could not be achieved in the experiment, even when effectively doubling the thermal loads discussed above. FIG. 7 is a graph illustrating these beneficial and unexpected results of example embodiment BiMAC 200. FIG. 7 illustrates inlet sub-cooling temperature (K) at inlet channel 64 as a function of flow rate (GPM) through all coolant channels 130 in example embodiment BiMAC 200. Four test series A-D were run, with point heat loads ranging from approximately 50 to 60 kW applied to the BiMAC surface. As shown in FIG. 7, example embodiment BiMAC 200 handled all heat loads with little variation in performance, including no dry-out, reflecting the improved they and hydro-dynamic properties of the BiMAC 200 discussed above.

Thus, the inventors have determined that example embodiment BiMACs having inclination of less than 10 degrees and more than about 5 degrees and coolant channel 130 having inner diameters of less than 4 inches and more than approximately 2 inches can adequately provide cooling and melt arrest in the same accident scenarios addressed by conventional BiMAC 100, while increasing free space in lower drywell 60 and reducing material stress and fatigue over conventional BiMAC 100.

Example embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A Basemat-Internal Melt Arrest and Coolability device (BiMAC), comprising:
    a distributor configured to receive a coolant; and
    a plurality of adjacent coolant channels connected to the distributor at a first end of the channels and configured to receive the coolant from the distributor,
    each of the channels having an inclination equal to or greater than about 5 degrees and less than 10 degrees with respect to horizontal,
    each of the channels having a second end with a vertical portion, the second end being open and configured to permit the coolant to exit,
    the BiMAC configured to absorb a thermal load of at least 100 kW/m2 from molten debris relocated on top of the BiMAC for at least 24 hours, wherein each of the coolant channels are configured to not completely void a liquid coolant flowing through the coolant channel during the 24 hours.

2. The BiMAC of claim 1, wherein each of the channels has an inner diameter of about 2 inches.

3. The BiMAC of claim 2, wherein each of the channels has an inclination of about 5 degrees with the horizontal.

4. The BiMAC of claim 1, further comprising:
an ablation shield covering the distributor and the plurality of coolant channels.

5. The BiMAC of claim 4, wherein the ablation shield is fabricated of at least one of a ceramic material and concrete.

6. The BiMAC of claim 1, further comprising:
a shielding material under the plurality of coolant channels, the shielding material supporting the plurality of coolant channels.

7. The BiMAC of claim 1, wherein the distributor is connected to a deluge line of an economic simplified boiling water reactor in order to receive coolant from the deluge line.

8. The BiMAC of claim 1, wherein the BiMAC is shaped to cover a basemat of a lower drywell and at least a portion of a wall of a lower drywell.

9. A Basemat-Internal Melt Arrest and Coolability device (BiMAC), comprising:
a plurality of adjacent coolant channels having an inclination equal to or greater than about 5 degrees and less than 10 degrees with respect to horizontal,
the BiMAC configured to absorb a thermal load of at least 100 kW/m2 from molten debris relocated on top of the BiMAC for at least 24 hours,
wherein each of the coolant channels are configured to not completely void a liquid coolant flowing through the coolant channel during the 24 hours.

10. The Bi MAC of claim 9, wherein the inclination is about 5 degrees with the horizontal.

11. The BiMAC of claim 10, wherein each of the coolant channels has an inner diameter of about 2 inches.

12. The BiMAC of claim 11, further comprising:
a distributor configured to receive the coolant, the plurality of coolant channels connected to the distributor at a first end of the channels and configured to receive the coolant from the distributor, each of the channels having a second end with a vertical portion, the second end being open and configured to permit the coolant to exit.

13. The BiMAC of claim 12, further comprising:
an ablation shield covering the distributor and the plurality of coolant channels.

14. The BiMAC of claim 13, wherein the ablation shield is fabricated of at least one of a ceramic material and concrete.

15. The BiMAC of claim 14, further comprising:
a shielding material under the plurality of coolant channels, the shielding material configured to support the plurality of coolant channels.

* * * * *